(12) United States Patent
Seil et al.

(10) Patent No.: US 7,734,256 B2
(45) Date of Patent: Jun. 8, 2010

(54) SYSTEM FOR INTERFACING WITH AN AUDIO PLAYER, AND METHOD OF MANUFACTURING SAME

(75) Inventors: Oliver Duncan Seil, Pasadena, CA (US); Ian Sinclair, Indian Falls, NY (US); Brian VanHarlingen, Torrance, CA (US); Thorben Neu, Los Angeles, CA (US); John Wadsworth, Los Angeles, CA (US)

(73) Assignee: Belkin International, Inc., Playa Vista, CA (US)

( * ) Notice: Subject to any disclaimer, the term of this patent is extended or adjusted under 35 U.S.C. 154(b) by 1175 days.

(21) Appl. No.: 11/248,762

(22) Filed: Oct. 11, 2005

(65) Prior Publication Data

US 2007/0082701 A1    Apr. 12, 2007

(51) Int. Cl.
*H04B 7/00* (2006.01)
(52) U.S. Cl. .................. 455/66.1; 455/3.06; 455/554.2; 455/557
(58) Field of Classification Search ................ 455/66.1, 455/3.01, 41.2, 347, 554.2, 556.1, 557, 559
See application file for complete search history.

(56) References Cited

U.S. PATENT DOCUMENTS 5,459,792 A * 10/1995 Reichel et al. ............. 381/111

2003/0211888 A1* 11/2003 Wolinsky .................. 463/41
2004/0224638 A1* 11/2004 Fadell et al. ............... 455/66.1
2007/0053523 A1* 3/2007 Iuliis et al. ................. 381/77

OTHER PUBLICATIONS

Monster iCarPlay Wireless Plus; www.monstercable.com/productPagePrint.asp?pin=260; retrieved from the internet on Feb. 17, 2005.
XtremeMac AirPlay FM Transmitter for iPod and iPod mini; www.xtrememac.com/adapters/airplay.shtml; retrieved from the internet on Feb. 17, 2005.
Griffin Technology iTrip FM Transmitter for iPod; www.griffintechnology.com/products/itrip/; retrieved from the internet on Feb. 17, 2005.
Belkin Auto Kit for iPod w/Dock Connector; www.catalog.belkin.com/IWCatProductPage.process?Merchant_Id=&Section_Id=201526&pcount=&Pro; retrieved from the internet on Feb. 17, 2005.

* cited by examiner

*Primary Examiner*—Nay A Maung
*Assistant Examiner*—Tuan H Nguyen
(74) *Attorney, Agent, or Firm*—Bryan Cave LLP

(57) ABSTRACT

A system for interfacing with an audio player comprises a housing (110, 410) containing a first connector (111, 411), a transmission device (120, 420) including a second connector (121, 421) capable of removable engagement with the first connector, a power interface (130, 430) electrically coupled to the housing, and an audio interface (140, 440) electrically coupled to the housing and capable of being coupled to the audio player. The transmission device is connectable both to the housing and to the audio player directly, and is capable of transmitting an audio signal generated by the audio player to a playback device such as a radio.

20 Claims, 5 Drawing Sheets

SYSTEM FOR INTERFACING WITH AN AUDIO PLAYER, AND METHOD OF MANUFACTURING SAME

FIELD OF THE INVENTION

This invention relates generally to audio equipment, and relates more particularly to signal transfer to and from an audio player.

BACKGROUND OF THE INVENTION

Audio players include digital music players capable of handling digital audio files in one or more file formats. Several formats for digital audio files exist, each offering its own combination of sound quality, compression rate, streaming capability, and other features. Some of the existing file formats are: AAC, ATRAC, MP3, AIFF, WMA, OGG, and WAV, but this list is not an exhaustive one. Portable audio players capable of playing digital audio files, and of storing them in large numbers, have become very popular. Such players are often referred to as MP3 players because of the popularity of that particular file format.

Transmitters have been developed in order to enable playback of stored digital audio files over speakers external to the portable audio player. As an example, such transmitters make it possible to play a song stored in the portable audio player over a car stereo. Wireless FM transmitters enable such playback on a locally-unused frequency of the FM spectrum without the need for cables or other connections between the player and the stereo. Existing transmitters, however, lack versatility in terms of the power sources with which they are compatible. This lack of versatility limits their usefulness. Accordingly, there exists a need for a transmitter system capable of interfacing with an audio player in a way that overcomes the limitations of the existing devices.

BRIEF DESCRIPTION OF THE DRAWINGS

The invention will be better understood from a reading of the following detailed description, taken in conjunction with the accompanying figures in the drawings in which.

Figure 1:
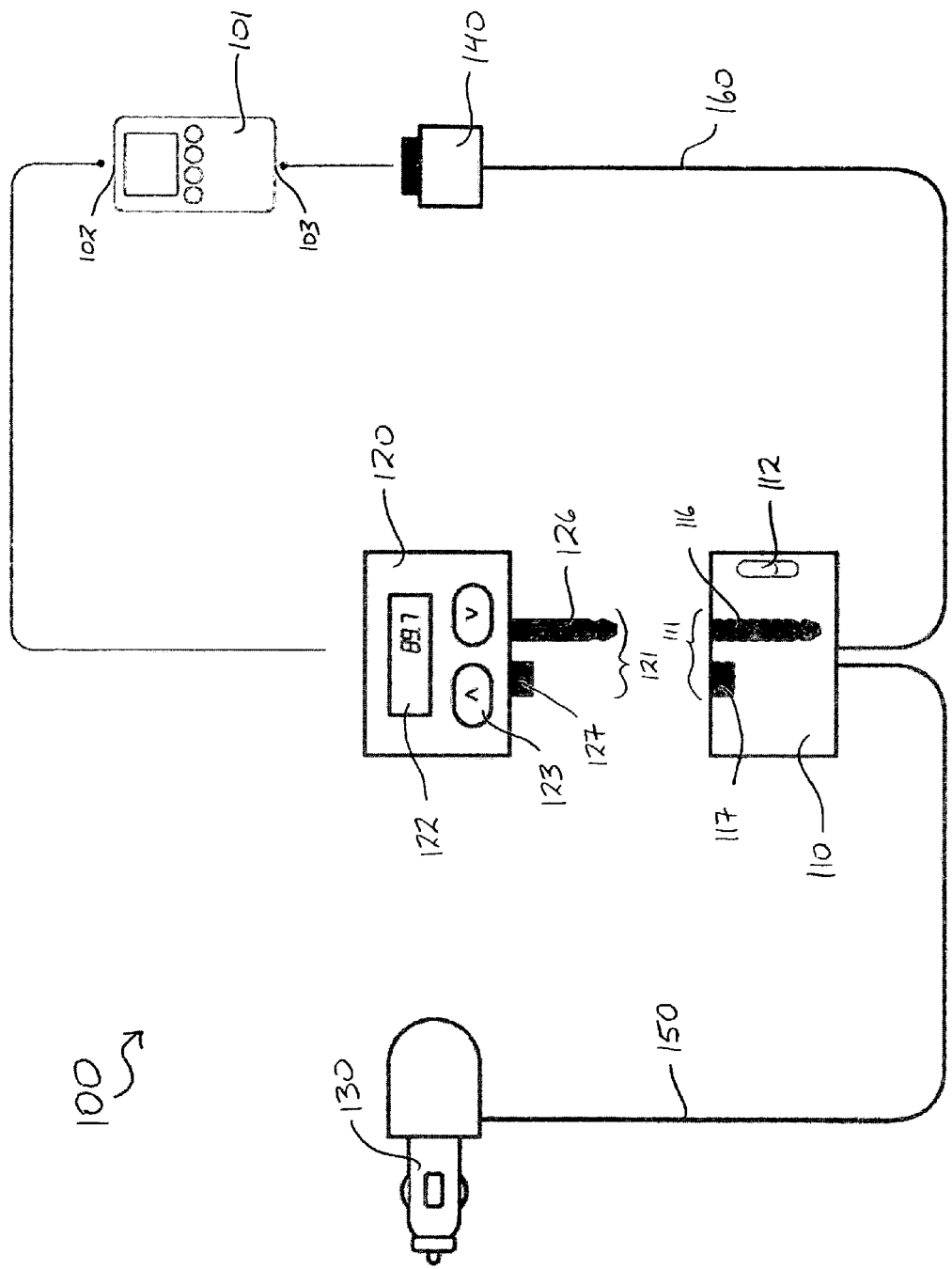
FIG. 1 is a schematic view of a system for interfacing with an audio player according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a system for interfacing with an audio player comprises a housing containing a first connector, a transmission device comprising a second connector capable of removable engagement with the first connector, a power interface electrically coupled to the housing, and an audio interface electrically coupled to the housing and capable of being coupled to the audio player. The transmission device is connectable both to the housing and to the audio player directly, and is capable of transmitting an audio signal generated by the audio player to a playback device such as a radio.

Referring now to the figures, FIG. 1 is a schematic view of a system 100 for interfacing with an audio player 101 according to an embodiment of the invention. As illustrated in FIG. 1, system 100 comprises: a housing 110 comprising a connector 111; a transmission device 120 comprising a connector 121 capable of removable engagement with connector 111; a power interface 130 electrically coupled to housing 110 via a cable 150; and an audio interface 140 electrically coupled to housing 110 via a cable 160. Audio interface 140 is also capable of being coupled to audio player 101, from which position it transfers power signals and audio signals back and forth between housing 110 and audio player 101, as further described below.

In the illustrated embodiment, connector 111 is contained within housing 110, and comprises a port 116 and a port 117. In a non-illustrated embodiment, connector 111 may protrude from housing 110 rather than be contained within it. As an example, port 116 can be a standard headphone jack, and port 117 can comprise a 4-pin port having a ground pin, a power pin, and serial communication pins. Corresponding ports are located in audio player 101, as will be further discussed below. In a particular embodiment, connector 111 is a proprietary connector, manufactured by or licensed from a manufacturer of or an owner of rights in audio player 101.

Connector 121 can be similar to connector 111. More specifically, connector 121 comprises a jack 126 and a pin 127. As an example, jack 126 can be a standard headphone jack, and pin 127 can comprise a 4-pin port having, like port 117, a ground pin, a power pin, and serial communication pins. As was the case with connector 111, connector 121 can be a proprietary connector, manufactured by or licensed from a manufacturer of or an owner of rights in audio player 101.

Audio player 101 can be any electronic device capable of playing audio signals such as music, speech, or the like. In one embodiment, audio player 101 is a portable device capable of storing and playing digital audio files having one or more file formats, including the file format known as MP3. One MP3 player in widespread use is sold under the trademark iPod by Apple Computer, Inc. of Cupertino, Calif. Many other MP3 players, as well as audio players of other types, also exist, and system 100 may be compatible with any or all of them.

Audio player 101 has an output port 102, referred to hereinafter as headphone jack 102, through which audio player 101 outputs a headphone out audio signal. Headphone jack 102 is similar or substantially identical to connector 111, described above. Audio player 101 also has an output port 103, referred to hereinafter as line out jack 103, though which audio player 101 outputs a line out audio signal.

Because the headphone out audio signal passes through an amplifier, it is distorted, deteriorated, and/or degraded. The effect may or may not be readily apparent to or easily detectable by a typical human ear. The headphone out audio signal is, however, generally thought of as being of lesser quality than the line out audio signal.

In a preferred embodiment, transmission device 120 is a tuneable FM transmitter that broadcasts digital audio files to an FM radio on the FM frequency to which the transmitter has been tuned. Transmission device 120 wirelessly transmits the first output signal when connector 121 is electrically coupled to headphone jack 102. Transmission device 120 comprises a visual display 122 for displaying a selected frequency, and a tuning control button 123 for selecting a frequency. Such transmitters are known in the art, and features and functions of transmission device 120 that are known to those of ordinary skill in the art will not be described in detail herein.

Transmission device 120 can be connected to audio player 101 via headphone jack 102. In that configuration, connector 121 is inserted into headphone jack 102, thus forming a physical and an electrical connection thereto. Transmission device 120 then receives the headphone out audio signal, and transmission device 120 is powered by audio player 101. More specifically, audio player 101 contains an internal battery (not shown) that powers both audio player 101 and, when it is connected to headphone jack 102, also powers transmission device 120. In at least one embodiment, the internal battery is rechargeable. In the event transmission device 120 is connected to audio player 101 while the internal battery is being recharged, the internal battery may still be thought of as the power source for transmission device 120, even though the ultimate power source during such recharging would be the charging power source.

In a particular embodiment, transmission device 120 requires approximately 3.3 volts in order to function, and will not respond to voltages of other magnitudes. In other embodiments, transmission device 120 may run off of or respond to different voltages.

Transmission device 120 can also be connected to audio player 101 via line out jack 103. In that configuration, connector 121 is inserted into connector 111 of housing 110, and housing 110 is connected to audio player 101 via audio interface 140. Transmission device 120 wirelessly transmits the second output signal when connector 121 is electrically coupled to connector 111 and housing 110 is electrically coupled to line out jack 103. Additionally, transmission device 120 receives the line out audio signal and receives power via power interface 130. More specifically, power interface 130, which in the illustrated embodiment comprises a cigarette lighter adapter, receives power from an outside power source. A portion of the power from such outside power source is passed, via cable 150 and connectors 111 and 121, to transmission device 120. As an example, the outside power source can be a vehicle battery. In one embodiment, the outside power source can also provide power sufficient to run audio player 101 and/or to charge the internal battery of audio player 101.

The line out audio signal typically, and in the illustrated embodiment, is output at a single intensity, and audio player 101 itself does not offer any way to change or control that intensity. Accordingly, housing 110 comprises a line level adjustment switch 112 capable of adjusting a volume or other parameter of the line out audio signal. Adjustment switch 112 can be a two-position slide switch, as depicted, or it can be a rotary dial, a button, a knob, or another type of switch or adjuster.

Housing 110 is preferably made of a material that is tough, hard, and rigid, has good chemical resistance and dimensional stability, exhibits good creep resistance, is relatively strong, and is inexpensive. Accordingly, housing 110 can be constructed of acrylonitrile butadiene styrene (ABS), polycarbonate, polypropylene, polyethylene, or a similar material, all of which, to varying degrees, exhibit the stated properties. One or more of power interface 130, audio interface 140, and transmission device 120 can be constructed of the same or similar materials.

Figure 2:
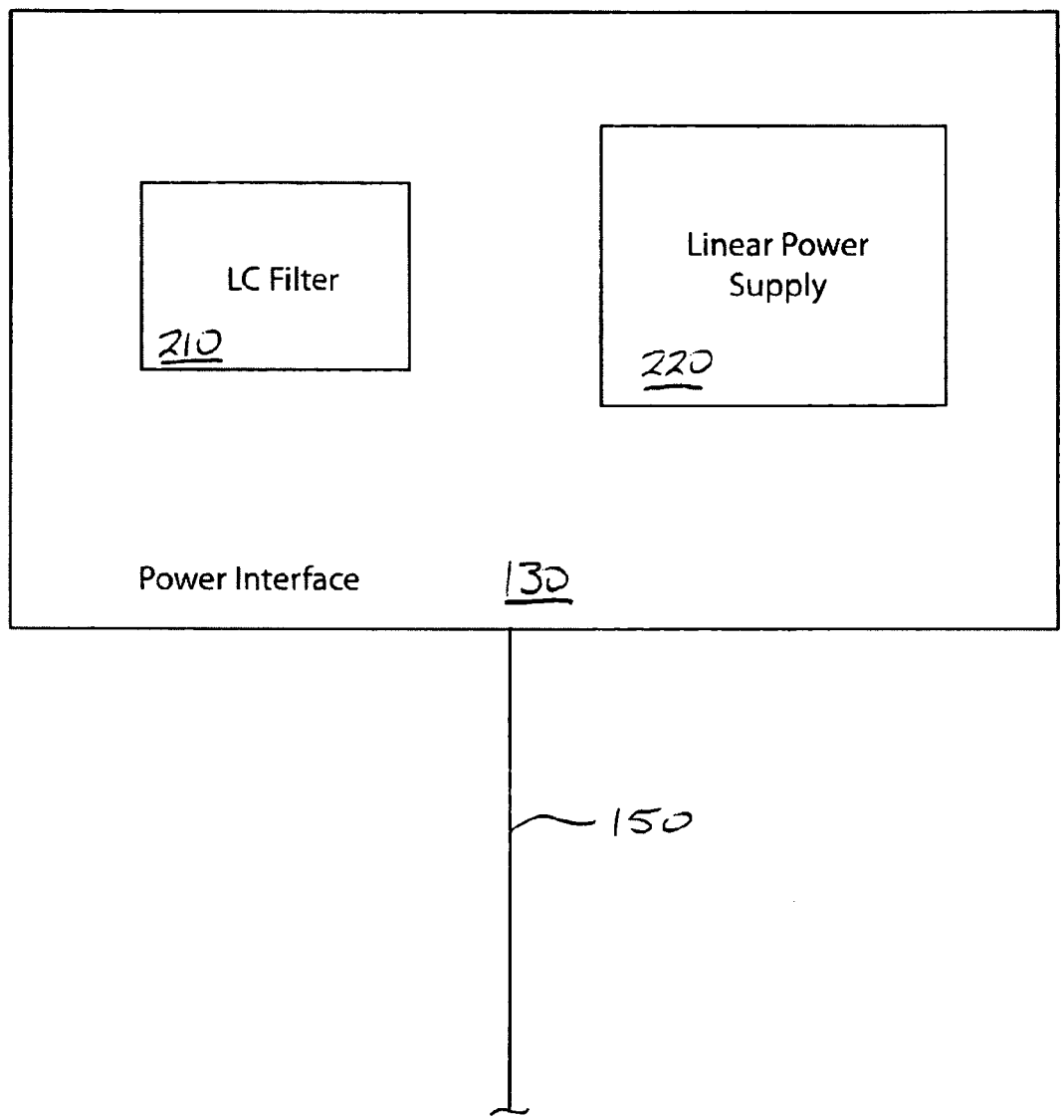
FIG. 2 is a block diagram of a power interface that forms a portion of the system of FIG. 1 according to an embodiment of the invention.

FIG. 2 is a block diagram of power interface 130 according to an embodiment of the invention. As illustrated in FIG. 2, power interface 130 contains a filter 210 and a power supply 220. In one embodiment, filter 210 comprises an inductor and a capacitor (an LC filter) capable of filtering out vehicle noise (of the electronic variety), ignition spikes, and the like. The values for inductance and capacitance of LC filter 210 can easily be chosen by one of ordinary skill in the art according to the form factor and/or another parameter of power interface 130. Other configurations for filter 210 are also possible, as known in the art.

In the illustrated embodiment, power interface 130 outputs power at a first level and, simultaneously, at a second level. More specifically, power supply 220 establishes a first electric potential and a second electric potential on separate conductors within cable 150 as further explained below. At least the first electric potential is also established on cable 160 (see FIG. 1), or on a conductor within cable 160. Power supply 220 is a linear 3.3 volt power supply, which a person of ordinary skill in the art can construct very easily. Power supply 220 takes an input of approximately 12 volts, supplied by the vehicle battery, and converts it to approximately 3.3 volts, the voltage required by transmission device 120.

In one embodiment, cable 150 comprises a plurality of conductors, none of which are explicitly shown in the drawings, including at least a first conductor, a second conductor, and a third conductor. Power supply 220 establishes the first electric potential on the first conductor, and establishes the second electric potential on the second conductor. Audio player 101 is electrically connected to the first conductor and is not electrically connected to the second conductor. Transmission device 120 is electrically connected to the second conductor and is not electrically connected to the first conductor Audio player 101 responds to the first electric potential and transmission device 120 responds to the second electric potential. In a particular manifestation of the illustrated embodiment, the first electric potential is approximately 12 volts, such as would typically be supplied by a car battery. In the same or another particular manifestation, the second electric potential is approximately 3.3 volts which, as mentioned above, is a power level sufficient to run transmission device 120.

Figure 3:
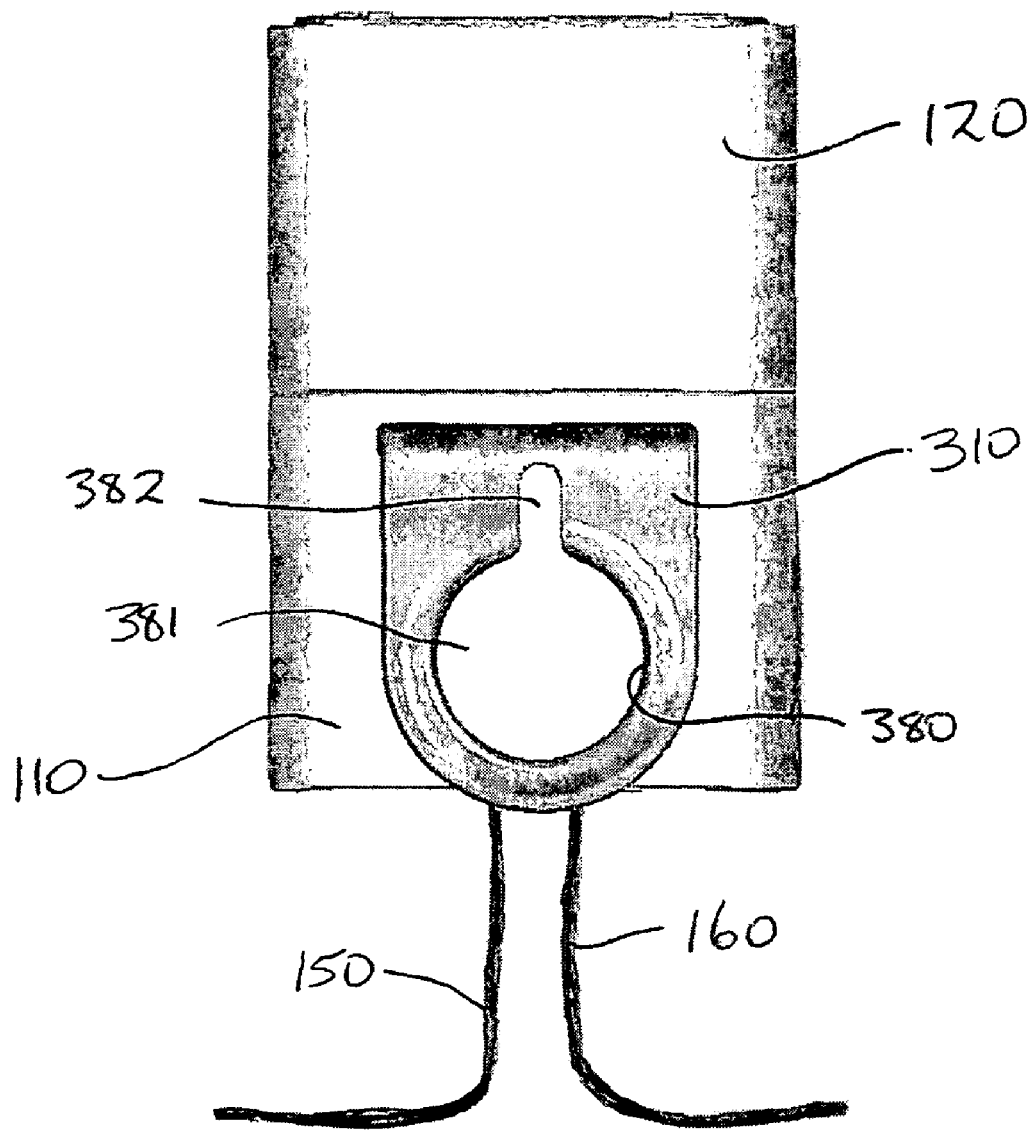
FIG. 3 is an elevational view of a housing and a transmission device according to an embodiment of the invention.

FIG. 3 is an elevational view of housing 110 and transmission device 120 according to an embodiment of the invention. FIG. 3 depicts housing 110 mated to transmission device 120, with connector 121 (see FIG. 1) inserted into connector 111 (also see FIG. 1). In this configuration, as explained above, transmission device 120 wirelessly transmits a line out audio signal from audio layer 101 (see FIG. 1).

As illustrated in FIG. 3, housing 110 further comprises a mounting feature 310 which in turn comprises an inside perimeter 380. Inside perimeter 380 defines an opening 381 and an opening 382 in mounting feature 310. As illustrated, opening 381 communicates with opening 382, and opening 382 is narrower than opening 381. As an example, mounting feature 310, perhaps in cooperation with a mounting arm or other non-illustrated additional mounting device, can be mated to a corresponding mounting mechanism (not shown) having a protrusion that cooperates with openings 381 and 382 to allow housing 110 to be mounted on a surface such as a wall, a vehicle dashboard, a vehicle windshield, a vehicle cup holder, a desktop, or the like. As will be apparent to one of ordinary skill in the art, the protrusion can have an outside perimeter shaped like inside perimeter 380 such that the protrusion is insertable in openings 381 and 382. The asymmetrical nature of such a protrusion would lock housing 110 in place.

Figure 4:
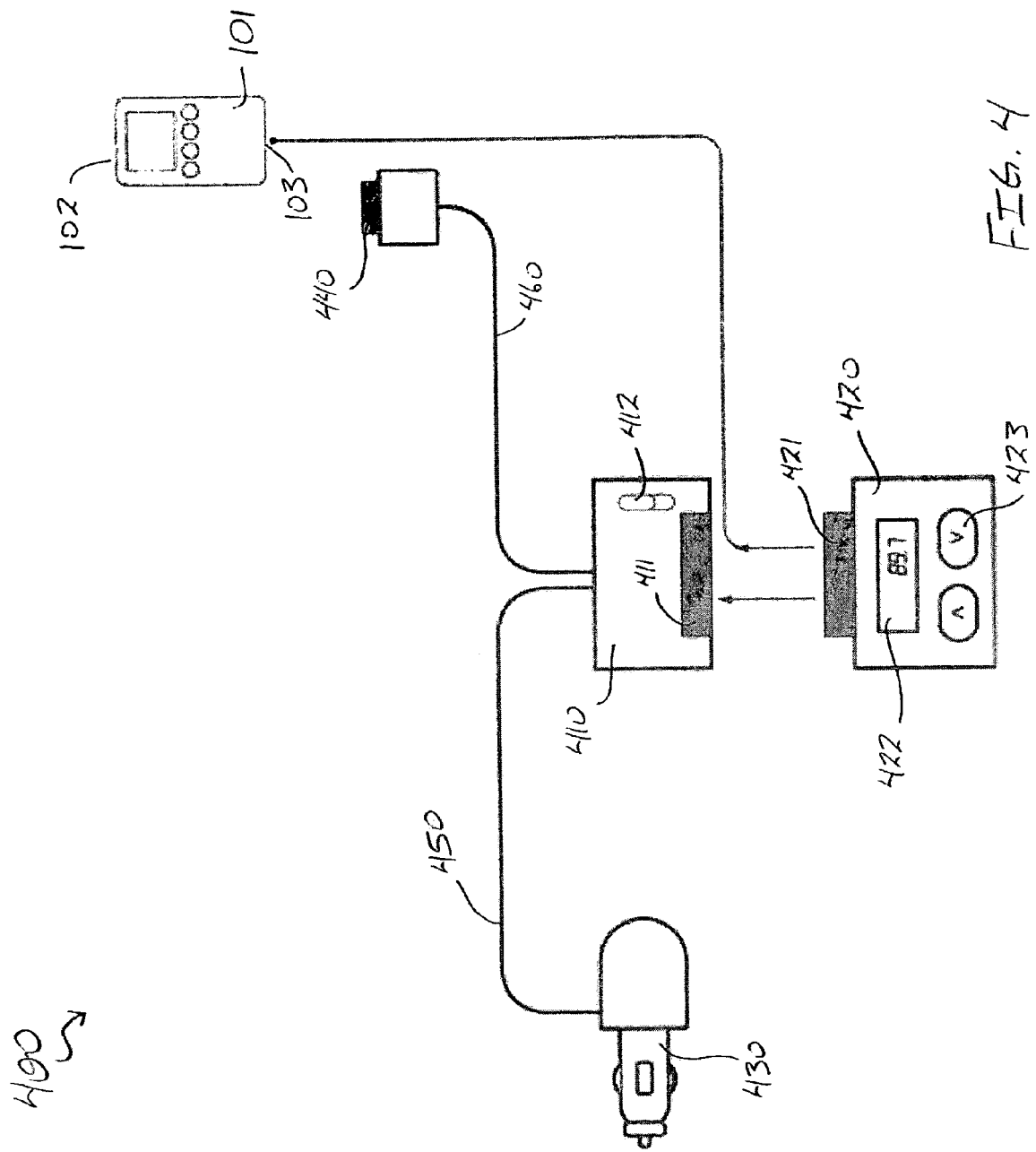
FIG. 4 is a schematic view of a system for interfacing with an audio player according to another embodiment of the invention.

FIG. 4 is a schematic view of a system 400 for interfacing with audio player 101 according to an embodiment of the invention. System 400 is similar to system 100, shown in FIG. 1, but, for example, differs from system 100 in the way its components interface with each other. As illustrated in FIG. 4, system 400 comprises: a housing 410 comprising a connector 411; a transmission device 420 comprising a connector 421 capable of removable engagement with connector 411; a power interface 430 electrically coupled to housing 410 via a cable 450; and an audio interface 440 electrically coupled to housing 410 via a cable 460. Audio interface 440 is also capable of being coupled to audio player 101, from which position it transfers power signals and audio signals back and forth between housing 410 and audio player 101, as further described below.

As was the case for transmission device 120, first shown in FIG. 1, transmission device 420 is, in a preferred embodiment, a tuneable FM transmitter that broadcasts digital audio files to an FM radio on the FM frequency to which the transmitter has been tuned. Transmission device 420 is not electrically couplable to headphone jack 102, and thus does not wirelessly transmit the first output signal as does transmission device 120 when electrically coupled to headphone jack 102. However, like transmission device 120, transmission device 420 comprises a visual display 422 for displaying a selected frequency, and a tuning control button 423 for selecting a frequency. In a particular embodiment, transmission device 420 requires approximately 3.3 volts in order to function, and will not respond to voltages of other magnitudes. In other embodiments, transmission device 420 may run off of or respond to different voltages.

Transmission device 420 can be connected to audio player 101 via line out jack 103. There are two ways in which this connection may be accomplished. In the first, connector 421 is inserted into connector 411 of housing 410, and housing 410 is connected to audio player 101 via audio interface 440. Transmission device 420 wirelessly transmits the second output signal when connector 421 is electrically coupled to connector 411 and housing 410 is electrically coupled to line out jack 103. Additionally, transmission device 420 receives the line out audio signal and receives power via power interface 430. More specifically, power interface 430, which in the illustrated embodiment comprises a cigarette lighter adapter, receives power from an outside power source. A portion of the power from such outside power source is passed, via cable 450 and connectors 411 and 421, to transmission device 420. As an example, the outside power source can be a vehicle battery. In one embodiment, the outside power source can also provide power sufficient to run audio player 101 and/or to charge the internal battery of audio player 101.

The second way a connection between transmission device 420 and audio player 101 may be accomplished is via a direct physical connection between the two components. In that configuration, connector 421 is inserted directly into line out jack 103, thus forming a physical and an electrical connection thereto. Transmission device 420 then receives the headphone out audio signal, and transmission device 420 is powered by audio player 101. More specifically, audio player 101 contains an internal battery (not shown) that powers both audio player 101 and, when it is connected to line out jack 103, also powers transmission device 420. In the event transmission device 420 is connected to audio player 101 while the internal battery is being recharged, the internal battery may still be thought of as the power source for transmission device 420, even though the ultimate power source during such recharging would be the charging power source.

Housing 410 comprises a line level adjustment switch 412 for the same reasons mentioned above during the discussion of line level adjustment switch 112, and line level adjustment switch 412 can be similar to line level adjustment switch 112. Housing 410, transmission device 420, power interface 430, and audio interface 440 may be constructed of the same materials that were mentioned earlier for housing 110, transmission device 120, power interface 130, and audio interface 140.

Figure 5:
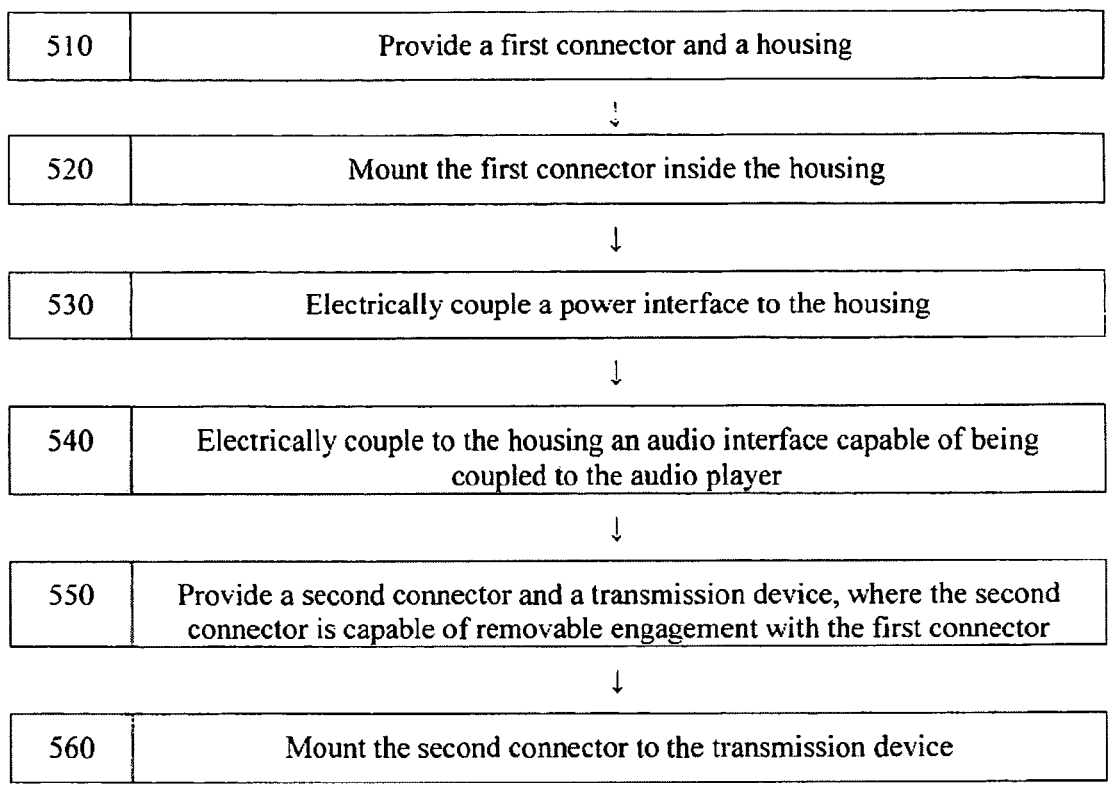
FIG. 5 is a flowchart illustrating a method of manufacturing a system for interfacing with an audio player according to an embodiment of the invention.

FIG. 5 is a flowchart illustrating a method 500 of manufacturing a system for interfacing with an audio player according to an embodiment of the invention. A step 510 of method 500 is to provide a first connector and a housing. As an example, the first connector can be similar to connector 111 and the housing can be similar to housing 110, both of which were first shown in FIG. 1. In one embodiment, the first connector is unique to, designed for, and/or functions only with a particular audio player. As an example, the first connector can be provided by and/or licensed from a manufacturer of, or owner of rights in, the audio player.

A step 520 of method 500 is to mount the first connector inside the housing. As an example, ABS or another material used for the housing can be poured or molded around the first connector, which is then locked in place inside the housing. In one embodiment, the first connector can be attached to a board or mounting piece that has been provided with one or more mold-lock features. Alternatively, the first connector can be provided with tabs that are hypersonically welded or otherwise attached to the housing. A person of ordinary skill in the art will recognize that a number of other attachment methods are also available.

A step 530 of method 500 is to electrically couple a power interface to the housing. As an example, the power interface can be similar to power interface 130, first shown in FIG. 1.

A step 540 of method 500 is to electrically couple to the housing an audio interface capable of being coupled to the audio player. As an example, the audio interface can be similar to audio interface 140, first shown in FIG. 1.

A step 550 of method 500 is to provide a second connector and a transmission device, where the second connector is capable of removable engagement with the first connector. As an example, the second connector can be similar to connector 121 and the transmission device can be similar to transmission device 120, both of which were first shown in FIG. 1. As was the case for the first connector, the second connector, in one embodiment, is unique to, designed for, and/or functions only with a particular audio player. As an example, the second connector can be provided by and/or licensed from a manufacturer of, or owner of rights in, the audio player.

A step 560 of method 500 is to mount the second connector to the transmission device. As an example, the second connector can be mounted to the transmission device using any of the attachment methods described above in connection with step 520, or methods that are similar hereto.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the system discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for interfacing with an audio player, the system comprising:
    a housing comprising a first connector;
    a transmission device comprising a second connector capable of removable engagement with the first connector, the second connector is further capable of removable engagement with the audio player;
    a power interface electrically connected to the housing; and
    an audio interface electrically connected to the housing and removably coupleable to the audio player,
    wherein:
        the transmission device is configured to wirelessly transmit signals;
        the transmission device is configured to receive the signals generated by the audio player when the audio interface is connected to the audio player and when the first connector of the housing is directly connected to the second connector of the transmission device; and
        the transmission device is further configured to receive the signals generated by the audio player when the second connector of the transmission device is directly connected to the audio player without using the audio interface and the first connector.

2. The system of claim 1 wherein:
    the audio interface transfers power signals and audio signals between the housing and the audio player.

3. The system of claim 2 wherein:
    the audio player contains an internal battery; and
    the power signals are capable of charging the internal battery.

4. The system of claim 1 wherein:
    the second connector is capable of being physically and electrically coupled to the audio player.

5. The system of claim 1 wherein:
    the housing further comprises:
        an adjustment switch; and
        a mounting feature.

6. The system of claim 1 wherein:
    the transmission device comprises a tuneable FM transmitter.

7. The system of claim 6 wherein:
    the tuneable FM transmitter comprises:
        a visual display; and
        a tuning control button.

8. The system of claim 1 wherein:
    the power interface outputs power at a first level and at a second level.

9. The system of claim 1 wherein:
    the power interface comprises a power supply;
    the power supply establishes a first electric potential and a second electric potential;
    the audio player responds to the first electric potential; and
    the transmission device responds to the second electric potential.

10. The system of claim 1 wherein:
    the second connector of the transmission device is configured to removably couple to a first output port of the audio player and is incapable of coupling to a second output port of the audio player; and
    the audio interface is configured to removably couple to the second output port of the audio player and is incapable of coupling to the first output port of the audio player.

11. A system for interfacing with an audio player having a first output port that outputs a first output signal and a second output port that outputs a second output signal, the system comprising:
    a housing containing a first connector;
    a transmission device comprising a second connector;
    a power interface electrically connected to the housing; and
    an audio interface electrically connected to the housing and capable of being coupled to the audio player,
    wherein:
        the second connector is capable of being removably connected to the first connector;
        the second connector is further capable of being removably connected to the first output port without using the first connector;
        the transmission device wirelessly transmits the first output signal when the second connector is connected to the first output port without using the first connector; and
        the transmission device wirelessly transmits the second output signal when the second connector is connected to the first connector.

12. The system of claim 11 wherein:
the audio interface transfers power signals and audio signals between the housing and the audio player.

13. The system of claim 12 wherein:
the transmission device receives power signals and audio signals from the audio player when the transmission device is coupled to the first output port.

14. The system of claim 12 wherein:
the audio player contains an internal battery; and
the power signals are capable of charging the internal battery.

15. The system of claim 14 wherein:
the housing further comprises:
an adjustment switch; and
a mounting feature.

16. The system of claim 14 wherein:
the transmission device comprises a tuneable FM transmitter comprising a visual display and a tuning control button.

17. The system of claim 16 wherein:
the power interface outputs power at a first level and at a second level.

18. The system of claim 11 further comprising:
a cable connecting the power interface and the housing, wherein:
the power interface comprises a filter and a power supply;
the power supply establishes a first electric potential and a second electric potential;
the audio player is electrically connected to the first electric potential; and
the transmission device is electrically connected to the second electric potential.

19. The system of claim 18 wherein:
the cable comprises a first conductor and a second conductor;
the power supply establishes the first electric potential on the first conductor, and establishes the second electric potential on the second conductor;
the audio player is electrically connected to the first conductor and is not electrically connected to the second conductor; and
the transmission device is electrically connected to the second conductor and is not electrically connected to the first conductor.

20. The system of claim 19 wherein:
the first electric potential is approximately 12 volts; and
the second electric potential is approximately 3.3 volts.

* * * * *